United States Patent
Uematsu (10) Patent No.: US 12,451,755 B2
(45) Date of Patent: Oct. 21, 2025

(54) ROTARY ELECTRIC MACHINE WITH STATOR AND OIL INJECTION PORT

(71) Applicant: MEIDENSHA CORPORATION, Tokyo (JP)

(72) Inventor: Taku Uematsu, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 18/694,235

(22) PCT Filed: Aug. 24, 2022

(86) PCT No.: PCT/JP2022/031826
§ 371 (c)(1),
(2) Date: Mar. 21, 2024

(87) PCT Pub. No.: WO2023/047875
PCT Pub. Date: Mar. 30, 2023

(65) Prior Publication Data
US 2024/0333081 A1    Oct. 3, 2024

(30) Foreign Application Priority Data

Sep. 22, 2021    (JP) .................................. 2021-154029

(51) Int. Cl.
*H02K 1/32* (2006.01)
*H02K 5/20* (2006.01)
*H02K 9/19* (2006.01)

(52) U.S. Cl.
CPC ............... *H02K 5/203* (2021.01); *H02K 1/32* (2013.01); *H02K 9/19* (2013.01)

(58) Field of Classification Search
CPC ............ H02K 1/32; H02K 5/20; H02K 5/209; H02K 9/19; H02K 9/163
See application file for complete search history.

(56) References Cited

U.S. PATENT DOCUMENTS

| | | |
|---|---|---|
| 2009/0184592 A1 | 7/2009 | Sano et al. |
| 2010/0320851 A1 | 12/2010 | Lambka et al. |

(Continued)

FOREIGN PATENT DOCUMENTS

| | | |
|---|---|---|
| CN | 104953767 A | 9/2015 |
| CN | 113422472 A | 9/2021 |

(Continued)

OTHER PUBLICATIONS

Hattori, Machine Translation of JP2005006429, Jan. 2005 (Year: 2005).*

(Continued)

*Primary Examiner* — Eric Johnson
(74) *Attorney, Agent, or Firm* — Foley & Lardner LLP (57) ABSTRACT

A rotary electric machine includes: a rotor; a shaft that penetrates the rotor along a rotation axis and is pivotally supported by a bearing; a stator that has a cylindrical shape, accommodates the rotor inside, and has a coil wound around an inner peripheral side; a rotor cover attached to an axial end surface of the rotor; and a casing having a flow passage for supplying oil to the bearing. The rotor cover has an oil receiving portion that forms a concentric clearance with respect to the shaft and receives the oil from the bearing in the clearance. The oil receiving portion has an injection port for injecting the oil guided to the clearance toward an inner periphery of the coil by centrifugal force.

4 Claims, 6 Drawing Sheets

(56) References Cited

U.S. PATENT DOCUMENTS

| | | |
|---|---|---|
| 2012/0049665 A1 | 3/2012 | Garriga et al. |
| 2015/0280522 A1 | 10/2015 | Austin et al. |
| 2020/0204021 A1* | 6/2020 | Kim .................. H02K 9/19 |
| 2020/0244123 A1 | 7/2020 | Kang |

FOREIGN PATENT DOCUMENTS

| | | | |
|---|---|---|---|
| DE | 10 2015 004 070 A1 | | 10/2015 |
| EP | 3 672 035 A1 | | 6/2020 |
| JP | 2005006429 A | * | 1/2005 |
| JP | 2007-159325 A | | 6/2007 |
| JP | 2009-171755 A | | 7/2009 |
| JP | 2010-028978 A | | 2/2010 |
| JP | 2010130721 A | * | 6/2010 |
| JP | 2011-010489 A | | 1/2011 |
| JP | 4990872 B2 | | 8/2012 |
| JP | 2014-030284 A | | 2/2014 |
| JP | 2020-096455 A | | 6/2020 |
| JP | 2021-136834 A | | 9/2021 |
| KR | 10-2020-0092680 A | | 8/2020 |

OTHER PUBLICATIONS

Kajino, Machine Translation of JP2010130721, Jun. 2010 (Year: 2010).*

* cited by examiner

ROTARY ELECTRIC MACHINE WITH STATOR AND OIL INJECTION PORT

TECHNICAL FIELD

The present invention relates to a rotary electric machine.

BACKGROUND ART

Conventionally, there has been known a rotary electric machine having a cooling structure for cooling that brings cooling oil into contact with a coil end portion of a stator in order to enhance cooling efficiency of a coil wound around a stator core.

In this type of rotary electric machine having the cooling structure, the cooling oil is injected downward from the upper side of an axial end of the rotary electric machine to the coil end portion. The cooling oil takes heat when coming into contact with the coil end portion, and flows toward an oil pan on the lower side along an outer periphery of the coil end portion.

In a case where the cooling oil is injected from the upper side of the rotary electric machine, in general, the cooling oil is not directly supplied to the inner peripheral side of the coil end portion, and is only indirectly cooled by oil bounced back after heat exchange, oil mist in a housing, or the like. Therefore, in the above configuration, a cooling effect by the oil on the inner peripheral side of the coil end portion is limited, and it is necessary to increase the overall supply amount of the cooling oil in order to enhance the cooling effect.

Further, for example, as in Patent Literatures 1 and 2, there is also proposed a cooling structure in which an oil supply passage is formed inside a rotor shaft along the axial direction, and cooling oil from the rotor shaft is injected to the inner side of a coil by centrifugal force.

CITATION LIST

Patent Literature

Patent Literature 1: JP 2011-10489 A
Patent Literature 2: JP 2007-159325 A

SUMMARY OF INVENTION

Technical Problem

However, in the cooling structure in which the oil is injected from the inside of the rotor shaft as in Patent Literatures 1 and 2, it is necessary to sufficiently increase the pressure of the cooling oil with a pump in order to deliver the oil into the shaft, and it is also necessary to provide an oil seal at a portion delivering the oil to the rotating shaft. Therefore, a cost of the cooling structure increases. Further, the rigidity of the rotor shaft may also decrease because the rotor shaft has a hollow structure in Patent Literatures 1 and 2.

The present invention has been made in view of the above circumstances, and provides a rotary electric machine capable of injecting oil to an inner periphery of a coil without supplying the oil into a rotor shaft.

Solution to Problem

A rotary electric machine of one aspect of the present invention includes: a rotor; a shaft that penetrates the rotor along a rotation axis and is pivotally supported by a bearing; a stator that has a cylindrical shape, accommodates the rotor inside, and has a coil wound around an inner peripheral side; a rotor cover attached to an axial end surface of the rotor; and a casing having a flow passage for supplying oil to the bearing. The rotor cover has an oil receiving portion that forms a concentric clearance with respect to the shaft and receives the oil from the bearing in the clearance. The oil receiving portion has an injection port for injecting the oil guided to the clearance toward an inner periphery of the coil by centrifugal force.

In the rotary electric machine of one aspect described above, the shaft may have a delivery portion that protrudes in the radial direction inside the clearance and delivers the oil to the oil receiving portion.

In the rotary electric machine of one aspect described above, the rotor cover may have an oil guide portion on an outer peripheral side of the oil receiving portion. The oil guide portion may include an inclined surface that reflects the oil injected from the injection port, and adjust a position where the coil is cooled by the oil.

Further, the rotor cover may be made of metal and cover the axial end surface of the rotor. Further, the axial end surface of the rotor may be cooled by the oil via the oil guide portion of the rotor cover.

In the rotary electric machine of one aspect described above, the casing may further include: an oil spreading portion that spreads the oil from an upper side of the coil; and an oil supply passage for supplying the oil to the oil spreading portion. Further, the flow passage may supply the oil branching from the oil supply passage.

Advantageous Effects of Invention

According to one aspect of the present invention, the oil can be injected to the inner periphery of the coil without supplying the oil into the rotor shaft.

DESCRIPTION OF EMBODIMENTS

Hereinafter, an embodiment of the present invention will be described with reference to the drawings.

In the embodiment, structures and elements other than the main part of the present invention will be described in a simplified or omitted manner in order for easy understanding. Further, the same elements are denoted by the same reference signs in the drawings. Note that shapes, dimensions, and the like of the respective elements illustrated in the drawings are schematically illustrated, and do not indicate actual shapes, dimensions, and the like.

In the drawings, an XYZ coordinate system is illustrated appropriately as a three-dimensional orthogonal coordinate system. In the XYZ coordinate system, a Z direction is a direction parallel to a rotation axis. An X direction is a direction orthogonal to the Z direction and corresponds to a direction perpendicular to the paper surface of FIG. 2. A Y direction is a direction orthogonal to both the X direction and the Z direction, and corresponds to the vertical direction in FIG. 2. Further, the rotation axis of the rotary electric machine is denoted by reference sign AX as necessary in the drawings. Note that, in the following description, the circumferential direction around the rotation axis AX is simply referred to as the circumferential direction, and the radial direction around the rotation axis AX is simply referred to as the radial direction.

Figure 1:
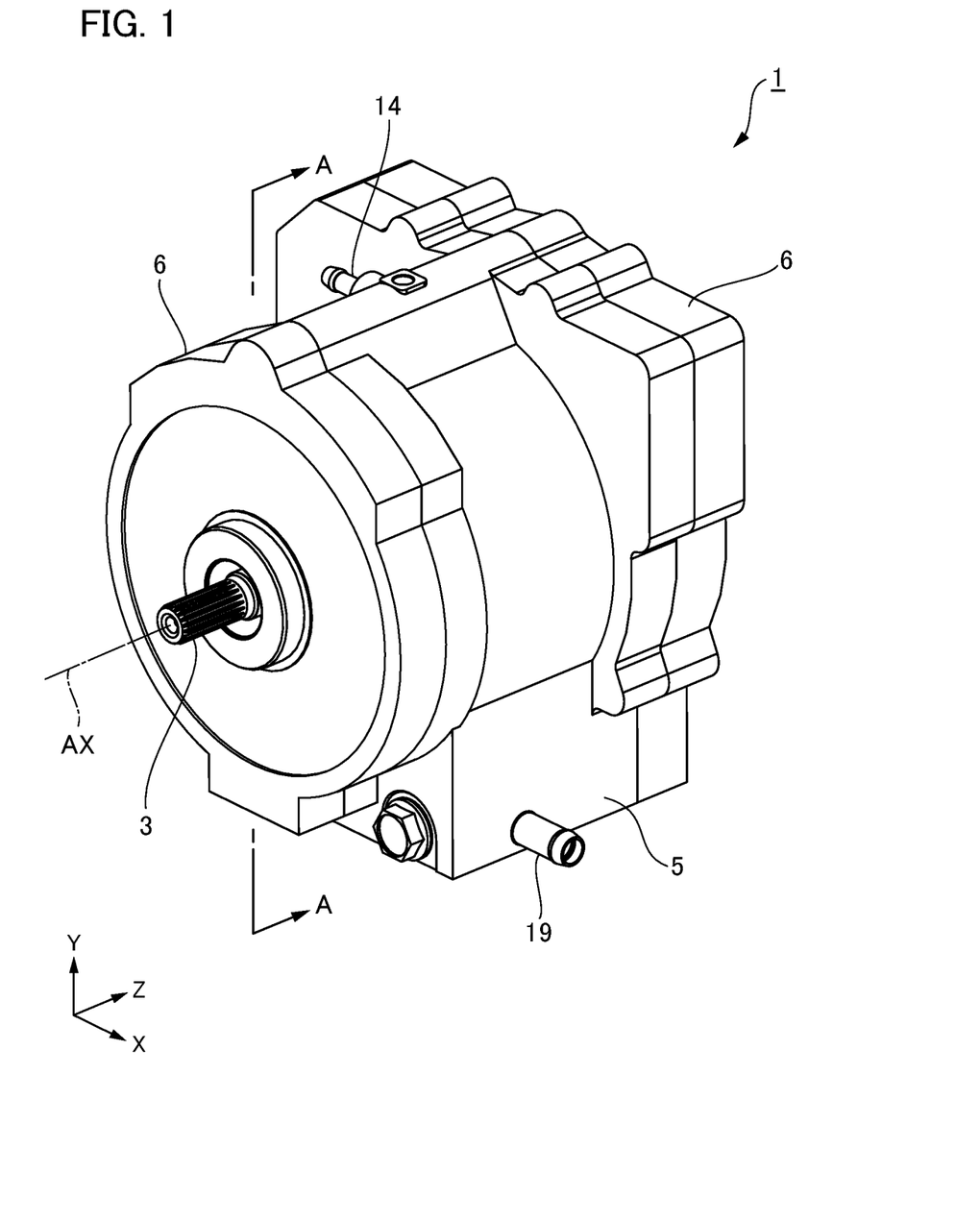
FIG. 1 is a perspective view illustrating an example of a rotary electric machine of the present embodiment.
Figure 2:
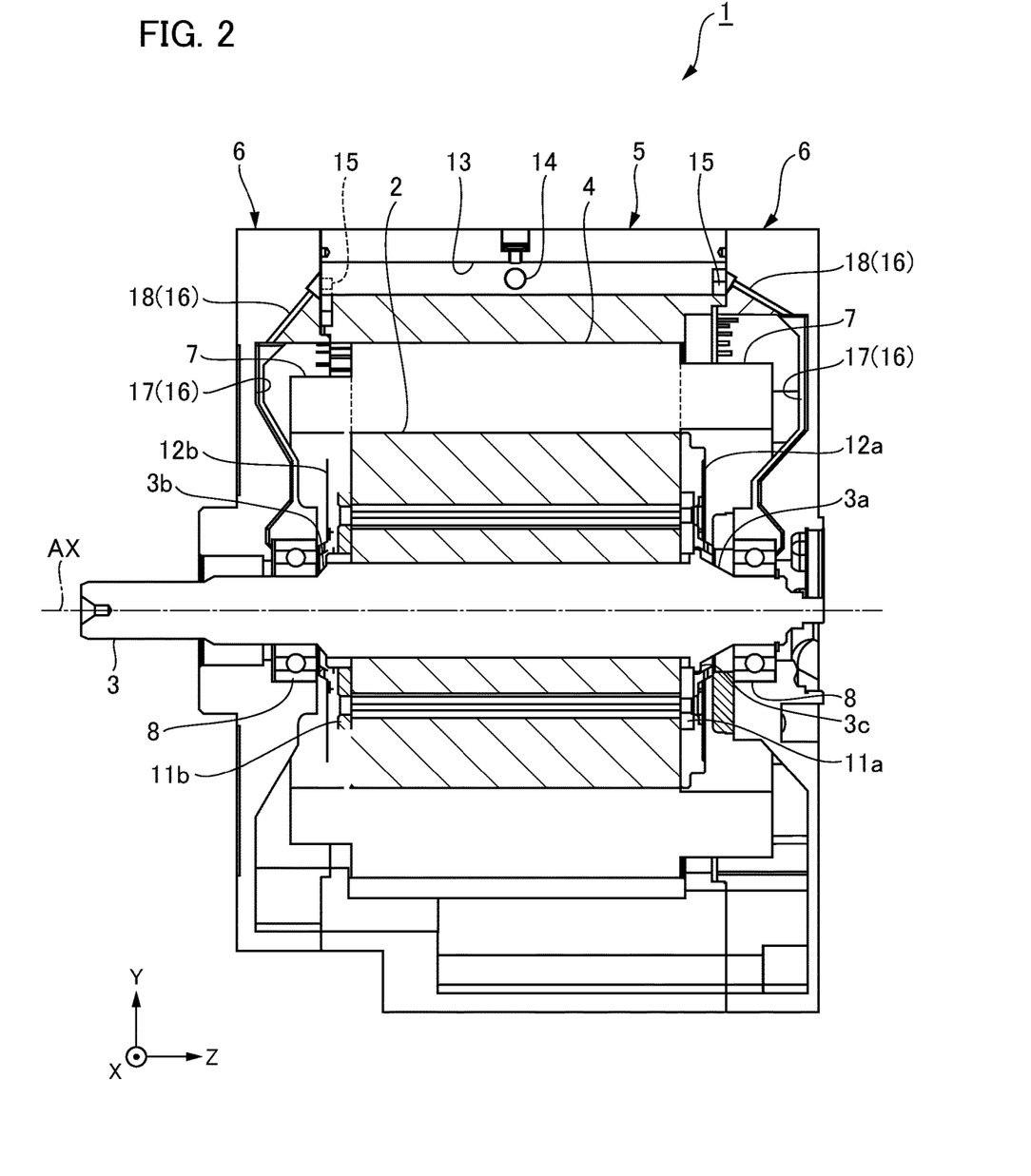
FIG. 2 is a cross-sectional view taken along line A-A of FIG. 1.
Figure 3:
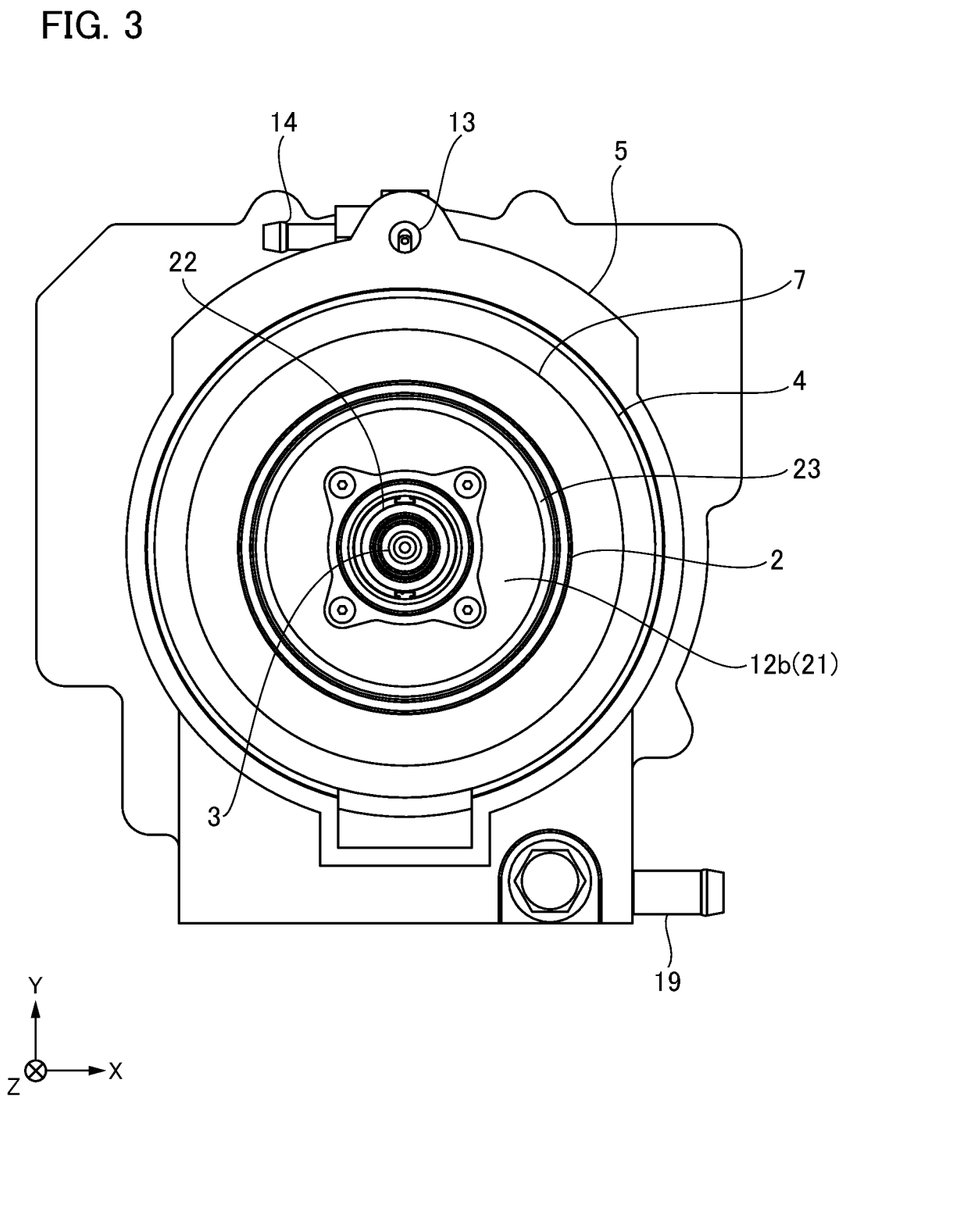
FIG. 3 is a front view of the rotary electric machine in a state where a housing cover on a load side is removed.
Figure 4:
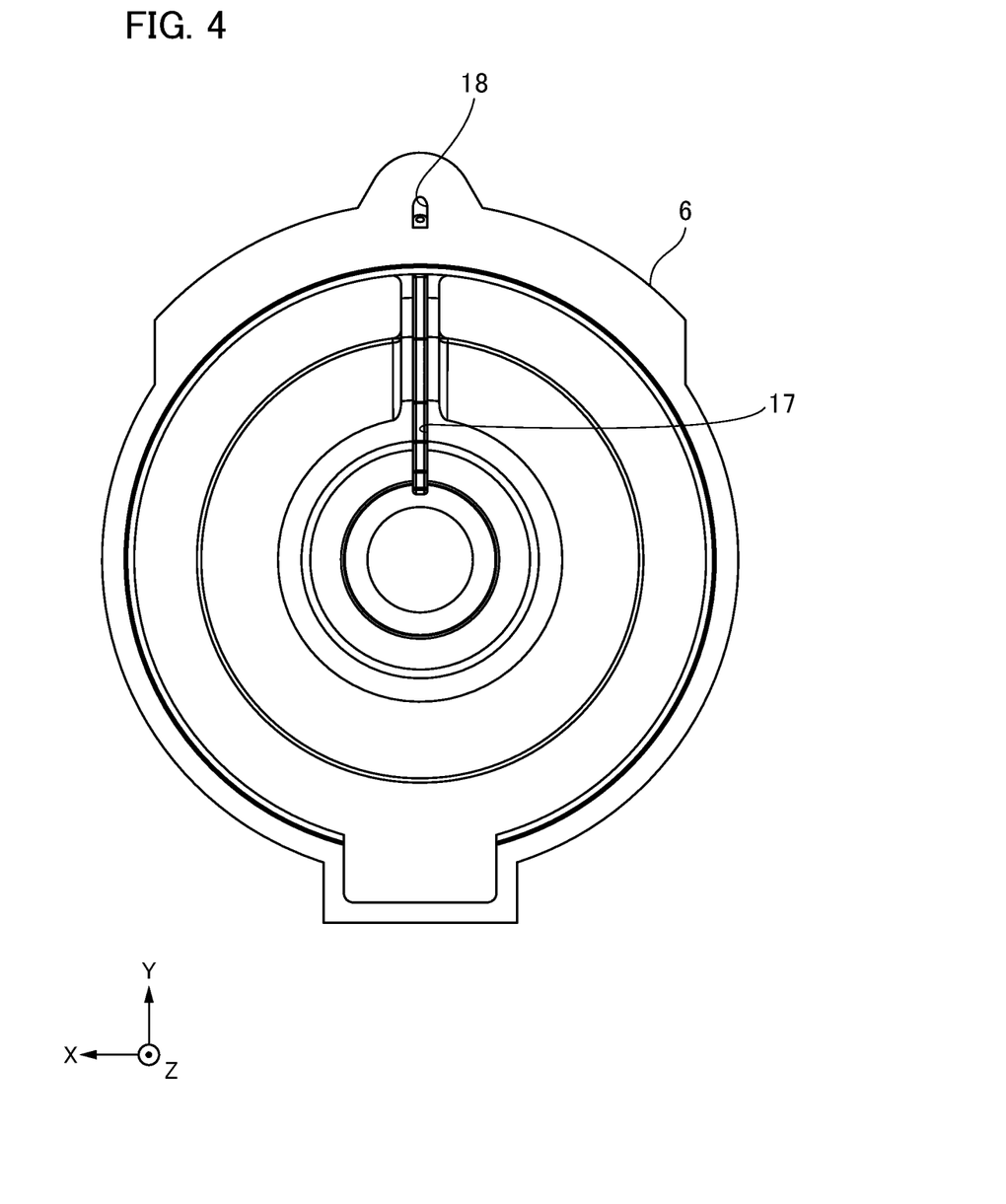
FIG. 4 is a view illustrating an inner surface side of the housing cover on the load side.

FIG. 1 is a perspective view illustrating an example of a rotary electric machine 1 of the present embodiment. FIG. 2 is a cross-sectional view taken along line A-A in FIG. 1. FIG. 3 is a front view of the rotary electric machine 1 in a state where a housing cover 6 on a load side is removed. FIG. 4 is a view illustrating an inner surface side of the housing cover 6 on the load side.

The rotary electric machine 1 of the present embodiment is an inner rotor type motor, and includes a rotor 2, a shaft 3, and a stator 4. The rotor 2, the shaft 3, and the stator 4 are accommodated in a casing including a housing body 5 and housing covers 6. Note that the housing body 5 and the housing covers 6 are all manufactured by casting.

The rotor 2 is, for example, an interior permanent magnet rotor or a surface permanent magnet rotor. A core of the rotor 2 is formed by laminating a plurality of electromagnetic steel sheets or the like in the axial direction. Further, the shaft 3 is fitted into the center of the rotor 2 so as to penetrate the core along the rotation axis AX. Further, end plates 11a and 11b and rotor covers 12a and 12b are attached to both axial ends of the rotor 2, respectively.

The shaft 3 has a flange portion 3c and a first tapered region 3a at a portion exposed to an anti-load side (right side in FIG. 2) from the core of the rotor 2. Further, the shaft 3 has a second tapered region 3b at a portion exposed from the core of the rotor 2 to a load side (left side in FIG. 2).

The flange portion 3c of the shaft 3 protrudes annularly in the radial direction of the shaft 3 and abuts on the end plate 11a on the anti-load side. Further, the first tapered region 3a of the shaft 3 is formed along the axial direction from a surface of the flange portion 3c on the anti-load side, and has a tapered shape reduced in diameter as a distance from the rotor 2 increases and tapered to the anti-load side. Further, the second tapered region 3b of the shaft 3 has a tapered shape reduced in diameter as a distance from the rotor 2 increases and tapered to the load side. The tapered regions 3a and 3b are examples of a delivery portion.

The end plates 11a and 11b are ring-shaped members each having a hole opened at the center to allow the shaft 3 to be inserted therethrough and having a smaller diameter than the rotor 2. The end plate 11a arranged on the anti-load side is interposed between the flange portion 3c of the shaft 3 and the rotor 2, and is in close contact with an axial end surface (first end surface) of the rotor 2 on the anti-load side. Further, the end plate 11b arranged on the load side (left side in FIG. 2) is in close contact with an axial end surface (second end surface) of the rotor 2 on the load side. The end plates 11a and 11b have a function of pressing the rotor 2 from both sides in the axial direction and holding the core of the rotor 2 made of the laminated steel sheet.

The rotor cover 12a arranged on the anti-load side covers the end plate 11a and the first end surface of the rotor 2 from the outside, and is fixed to the rotor 2 in close contact with the first end surface. Further, the rotor cover 12b arranged on the load side covers the end plate 11b and the second end surface of the rotor 2 from the outside, and is fixed to the rotor 2 in close contact with the second end surface. Note that a detailed configuration of the rotor covers 12a and 12b will be described later.

The stator 4 has a cylindrical stator core and accommodates the rotor 2 inside with a slight air gap. A plurality of slots (not illustrated) are formed along the axial direction on an inner periphery of the stator 4, and a coil is wound around the slots. A coil end portion 7 of the coil overhangs from the stator 4 at both axial ends of the stator 4, and has an annular shape in the circumferential direction.

In the rotary electric machine 1, an attractive force or a repulsive force with respect to a magnetic field of the rotor 2 is generated by sequentially switching the magnetic field of the stator 4 by current control of the coil. As a result, the rotor 2 and the shaft 3 rotate, whereby the rotary electric machine 1 is driven. At this time, the coil generates heat by energization. Further, a permanent magnet accommodated in the rotor 2 is also heated by electromagnetic induction.

The housing body 5 of the rotary electric machine 1 is a casing that has a cylindrical space which is opened on both sides in the axial direction. The rotor 2 into which the shaft 3 is fitted and the stator 4 are concentrically arranged in the cylindrical space of the housing body 5. The stator 4 is fitted to an inner periphery of the housing body 5, and the housing body 5 is attached so as to cover an outer peripheral surface of the stator 4.

The housing covers 6 are respectively attached to the housing body 5 on both the sides in the axial direction. As a result, openings on both the sides of the housing body 5 are closed by the housing covers 6, respectively. Further, each of the housing covers 6 is provided with a bearing 8, and the shaft 3 is axially supported by the bearings 8 of the housing covers 6 in a rotatable manner. Note that an end of the shaft 3 on the load side penetrates the housing cover 6 and protrudes outward.

Further, the housing body 5 has an oil supply passage 13 for oil cooling of the coil end portion 7. The oil supply passage 13 is an oil passage through which cooling oil flows via an oil cooler and an oil pump (both not illustrated), and is connected to an oil inlet 14 through which the cooling oil is received. The oil supply passage 13 is arranged on the upper side of the stator 4 in FIG. 2. The oil supply passage 13 extends in the axial direction in the housing body 5, and both sides thereof are closed by the housing cover 6. Further, ends of the oil supply passage 13 are connected to first flow passages 15 and second flow passages 16, respectively. Note that the first flow passages 15 and the second flow passages 16 are formed on the load side and the anti-load side of the rotary electric machine 1, respectively, and the both have substantially the same configuration.

The first flow passage 15 is a flow passage branching from the oil supply passage 13 and extending in the circumferential direction, and a plurality of holes are opened downward in the flow passage. Each of the holes of the first flow passage 15 communicates with an internal space of the housing body 5 at a position facing an outer peripheral surface of the coil end portion 7. The first flow passage 15 is an example of an oil spreading portion, and has a function of spreading the cooling oil from the oil supply passage 13 to the coil end portion from the upper side.

The second flow passage 16 is a flow passage for supplying the oil to the bearing 8 via the housing cover 6. The second flow passage 16 includes a groove portion 17 formed in the housing cover 6 and a communication hole 18 connecting the oil supply passage 13 and the groove portion 17.

The groove portion 17 of the second flow passage 16 is formed on an inner surface side of the housing cover 6, and extends vertically along the radial direction of the rotary electric machine 1 from the oil supply passage 13 to the bearing 8 as illustrated in FIGS. 2 and 4. Although the groove portion 17 of the housing cover 6 on the load side is illustrated in FIG. 4, the groove portion 17 of the housing cover 6 on the anti-load side is also configured similarly to that on the load side.

The communication hole 18 of the second flow passage 16 is formed to be inclined downward with respect to the axial direction from the end of the oil supply passage 13 in the housing cover 6, and communicates with an upper end of the groove portion 17. As a result, part of the cooling oil from the oil supply passage 13 is supplied to the bearing 8 via the communication hole 18 and the groove portion 17 of the second flow passage 16.

Further, the vicinity of a bottom surface of the housing body 5 functions as an oil pan in which the oil subjected to heat exchange with the coil end portion 7 is stored. The housing body 5 is provided with an oil outlet 19 from which the oil stored in the oil pan is sucked out. The oil outlet 19 of the housing body 5 is connected to the oil pump.

Further, the rotor covers 12a and 12b of the present embodiment can spread the oil supplied to the bearing 8 from the shaft 3 side toward an inner periphery of the coil end portion 7 by centrifugal force. Hereinafter, the spreading of oil by the rotor covers 12a and 12b will be described. Hereinafter, the rotor covers 12a and 12b will be also referred to as a rotor cover 12 when common items are described.

Figure 5:
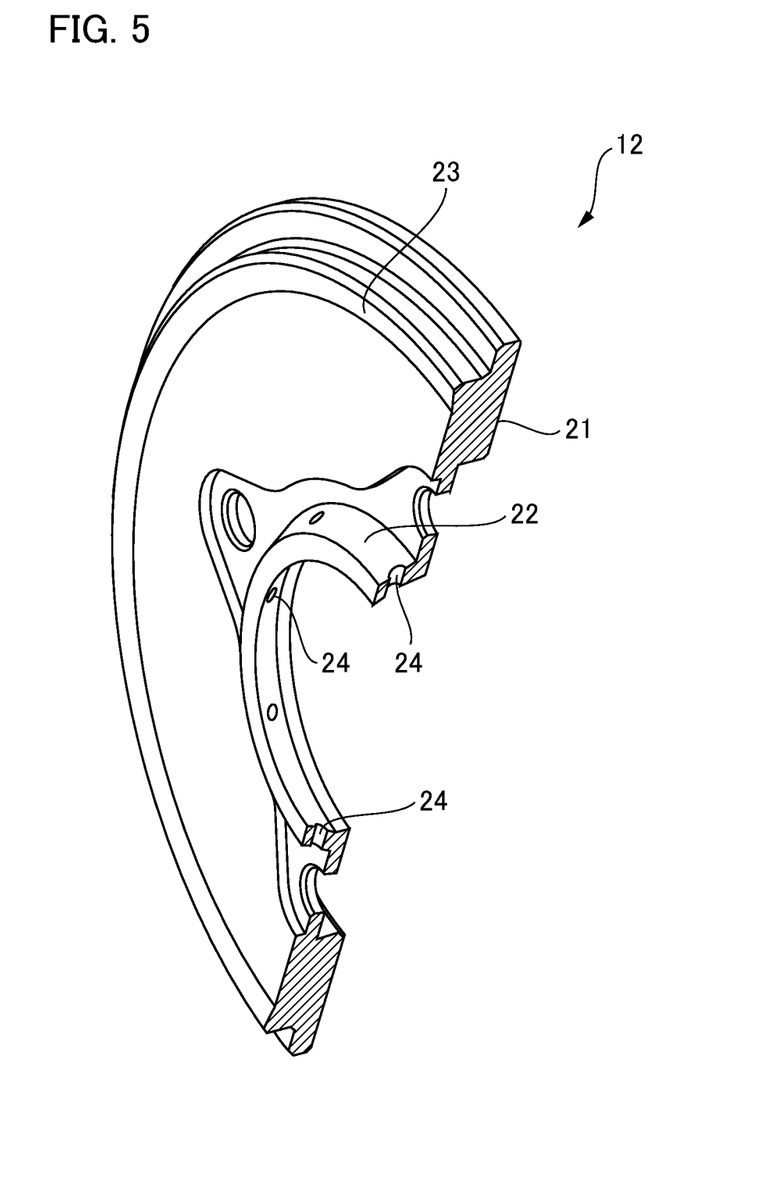
FIG. 5 is a perspective cutaway view of a rotor cover.
Figure 6:
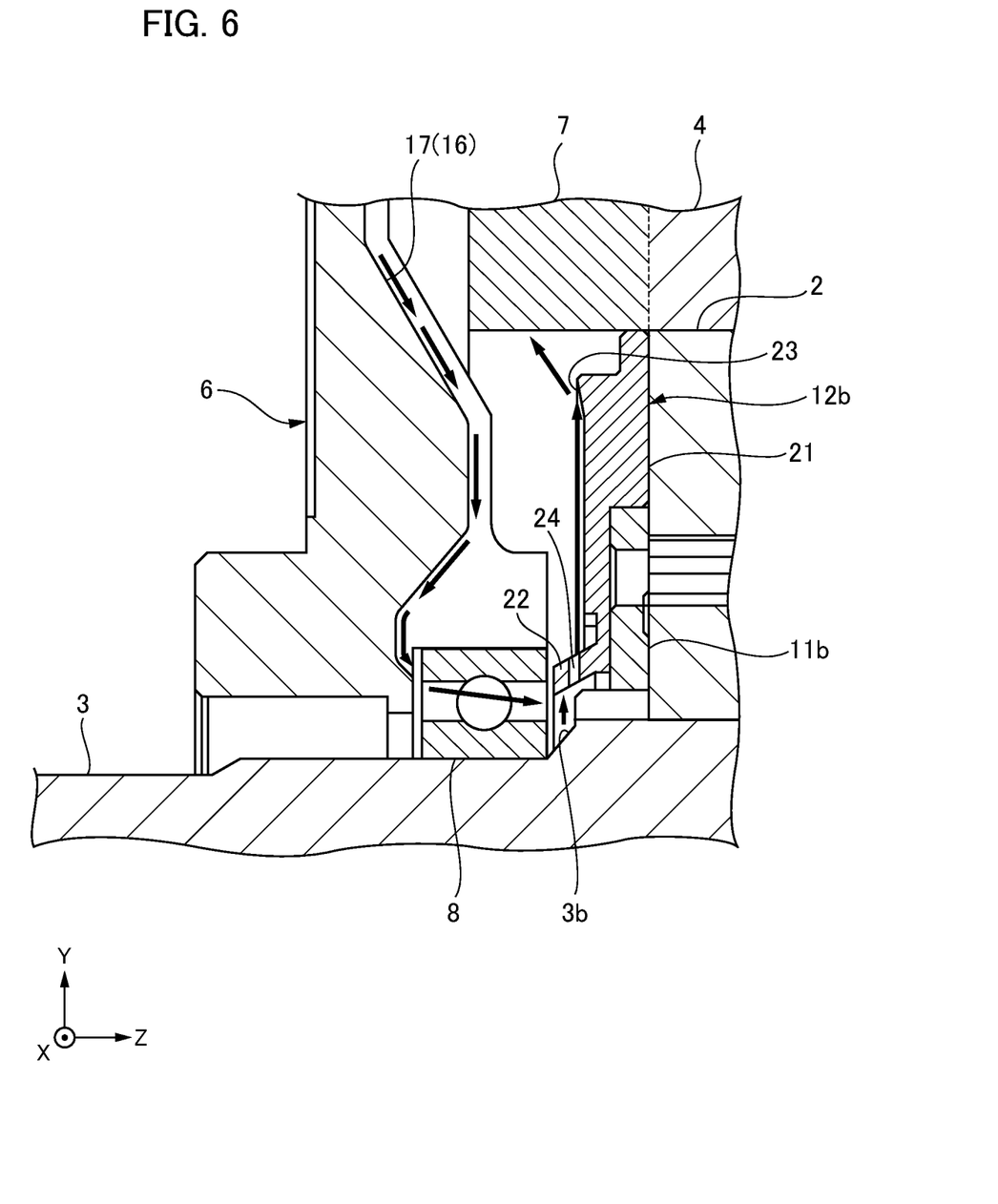
FIG. 6 is an enlarged view of the vicinity of a bearing on the load side in FIG. 2.

FIG. 5 is a perspective cutaway view of the rotor cover 12. FIG. 6 is an enlarged view of the vicinity of the bearing on the load side in FIG. 2.

The rotor cover 12 is a disk-shaped member made of metal, and includes a cover body 21, an oil receiving portion 22, and an oil guide portion 23. The cover body 21 of the rotor cover 12 has an opening portion through which the shaft 3 can be inserted at the center, and has a disk shape having a dimension corresponding to an outer diameter of the rotor 2. A front surface of the cover body 21 faces an inner surface of the housing cover 6, and a back surface of the cover body 21 faces the end plate and the axial end surface of the rotor 2. The cover body 21 covers the axial end surface of the rotor 2, thereby functioning to prevent the permanent magnet inserted into the rotor 2 from falling off.

The oil receiving portion 22 is formed in an annular shape on at outer edge on an inner peripheral side of the cover body 21, and has a function of receiving the oil from the bearing 8 in a clearance formed with respect to an outer peripheral surface of the shaft 3. The oil receiving portion 22 protrudes from the front surface of the cover body 21 in the axial direction of the rotary electric machine 1, and has a tapered shape in which an inner peripheral surface increases in diameter from the front surface side toward the back surface side of the rotor cover 12.

The oil receiving portion 22 is arranged concentrically with a tapered region of the shaft 3 and covers the tapered region from the outside. The oil receiving portion 22 of the rotor cover 12b is arranged at a position corresponding to the second tapered region 3b of the shaft 3 as illustrated in FIGS. 2 and 6. Similarly, the oil receiving portion 22 of the rotor cover 12a is arranged at a position corresponding to the first tapered region 3a of the shaft 3 as illustrated in FIG. 2.

An inner diameter of the oil receiving portion 22 is set to be larger than an outer diameter of the shaft 3, and the concentric clearance is formed around the shaft 3 with respect to the oil receiving portion 22. Further, the rotor cover 12 is attached to the rotor 2 such that a distal end of the oil receiving portion 22 opposes the bearing 8 in the axial direction.

Further, at least one oil injection port 24 communicating with the oil receiving portion 22 in the radial direction is formed in the oil receiving portion 22. For example, a plurality of the oil injection ports 24 are formed in the oil receiving portion 22 at regular intervals (for example, intervals of 45 degrees) in the circumferential direction. Note that the number and arrangement intervals of the oil injection ports 24 in the oil receiving portion 22 can be appropriately changed.

The oil guide portion 23 is formed in an annular shape on an outer peripheral side of the front surface of the cover body 21. The oil guide portion 23 has an inclined surface having a tapered shape, and has a function of reflecting the oil injected from the oil injection port 24 by the inclined surface and guiding the oil to the coil end portion 7. FIG. 5 illustrates the oil guide portion 23 having a shape in which an outer peripheral side of the inclined surface ascends with respect to the front surface of the cover body 21. However, the shape of the oil guide portion 23 is not limited to the above, and for example, an inclined surface having a shape descending from the front surface of the cover body 21 toward the outer peripheral side may be formed.

Hereinafter, a flow of oil in the rotary electric machine 1 of the present embodiment will be described.

In the rotary electric machine 1, the oil stored in the oil pan of the housing body 5 is sucked out from the oil outlet 19 by driving of the oil pump and cooled by the oil cooler. The oil cooled by the oil cooler is delivered from the oil inlet 14 to the oil supply passage 13 located on the upper side of the housing body 5. In the oil supply passage 13, the oil flows to a first side (the anti-load side) and a second side (load side) in the axial direction. In the following description, oil flowing toward the load side of the oil supply passage 13 will be described, and redundant description of oil flowing toward the anti-load side will be omitted.

The oil flowing to the load side of the oil supply passage 13 branches into the first flow passage 15 and the second flow passage 16 at the end of the oil supply passage 13. The oil flowing into the first flow passage 15 is spread to the coil end portion 7 from the upper side, and flows toward the lower side on an outer periphery of the coil end portion 7 from both sides in the counterclockwise direction and the clockwise direction. At this time, the oil in contact with the coil end portion 7 takes heat, whereby the coil end portion 7 is cooled from the outer peripheral side.

On the other hand, the oil flowing into the second flow passage 16 is guided to the bearing 8 through the communication hole 18 and the groove portion 17 as indicated by arrows in FIG. 6. Then, the oil passing through the second flow passage 16 is supplied from between the housing cover 6 and the bearing 8 to the bearing 8, and lubrication of the bearing 8 is secured.

Further, the oil supplied from between the housing cover 6 and the bearing 8 to the bearing 8 reaches the rotor 2 side through, for example, the inside of the bearing 8, and thereafter, flows along the shaft 3 into the clearance formed between the shaft 3 and the oil receiving portion 22 as indicated by arrows in FIG. 6. Here, since the rotor 2 and the shaft 3 rotate when the rotary electric machine 1 is driven, centrifugal force acts on the oil flowing into the clearance between the shaft 3 and the oil receiving portion 22. Further, the oil flowing into the clearance between the shaft 3 and the oil receiving portion 22 is scraped out and delivered radially outward by the tapered region of the shaft 3 protruding in the radial direction.

Through the above action, the oil flowing into the clearance moves toward the inner peripheral surface of the oil receiving portion 22, and is injected from the oil injection port 24 by the centrifugal force. The oil injected from the oil injection port 24 is reflected by the oil guide portion 23 of the cover body 21 and then comes into contact with the inner periphery of the coil end portion 7. Then, the oil in contact with the coil end portion 7 takes heat, whereby the coil end portion 7 is also cooled from the inner peripheral side.

Here, a position of the oil injection port 24 relative to the coil end portion 7 changes in the circumferential direction as the rotor 2 rotates, the oil from the oil injection port 24 is injected to the entire inner periphery of the coil end portion 7. Further, once the oil from the oil injection port 24 is reflected by the oil guide portion 23, the position (cooling position) where the oil hits on the inner periphery of the coil end portion 7 is adjusted to a desired position according to an angle of the inclined surface. Further, the oil is spread by contact with the oil guide portion 23, and thus, the oil can be brought into contact with a wider range of the inner periphery of the coil end portion 7.

Further, the permanent magnet accommodated in the rotor 2 is thermally connected to the rotor cover 12 made of metal and in close contact with the axial end surface of the rotor 2. The rotor cover 12 is also cooled by the oil when the oil hits the oil guide portion 23 in addition to the contact with the oil at the oil receiving portion 22, and thus, the permanent magnet of the rotor 2 can also be cooled from the axial end side.

Note that both the oil spread to the coil end portion 7 from the upper side and the oil dropping after being injected to the inner periphery of the coil end portion 7 flow back to the oil pan and are stored therein. Then, the oil in the oil pan is delivered again toward the oil cooler by driving of the oil pump.

As described above, the rotor cover 12 having the oil receiving portion 22 is attached to the rotor 2 in the rotary electric machine 1 of the present embodiment. The oil receiving portion 22 forms the concentric clearance with respect to the shaft 3 and receives oil from the bearing 8 through the clearance. Further, the oil guided to the clearance is injected from the oil injection port 24 of the oil receiving portion 22 toward the inner periphery of the coil by the centrifugal force. As a result, the inner peripheral side of the coil can be cooled with the oil in the rotary electric machine 1 of the present embodiment.

Further, in the configuration of the present embodiment, the oil supplied to the bearing 8 is received in the clearance between the oil receiving portion 22 and the shaft 3, and is injected from the oil injection port 24 by the centrifugal force. In the present embodiment, it is not necessary to provide an oil flow passage in the shaft, and thus, a cost of a cooling structure can be suppressed, and a decrease in rigidity of the shaft is not caused.

The present invention is not limited to the above-described embodiment, and various improvements and design modifications may be made within the scope not departing from the gist of the present invention.

Although the configuration example of the motor has been described as an example of the rotary electric machine 1 in the above-described embodiment, the rotary electric machine of the present invention can also be applied to an oil-cooled generator.

Further, the configuration example in which the tapered region is formed in the shaft 3 as the delivery portion to oppose the oil receiving portion 22 of the rotor cover 12 has been described in the above-described embodiment, but the configuration of the delivery portion is not limited to the above. For example, one or more protrusions may be formed in the circumferential direction of the shaft 3, and the oil from the bearing 8 may be scraped up with the protrusions and delivered to the oil receiving portion 22. Further, the oil from the bearing 8 may be moved to the oil receiving portion 22 by the centrifugal force without forming the taper or the protrusion on the shaft 3 side.

Further, the configuration example in which the oil from the oil injection port 24 is reflected by the inclined surface of the oil guide portion 23 has been described in the above-described embodiment, but the oil guide portion 23 is not necessarily provided in the rotor cover 12. Further, a plurality of the oil injection ports 24 having different inclinations in the axial direction may be formed in the oil receiving portion 22 to generate a flow for reflecting oil on the oil guide portion 23 and a flow for directly injecting oil to the coil end portion 7.

Further, the embodiment disclosed herein is to be considered as illustrative and not restrictive in all respects. The scope of the present invention is indicated not by the above description but by the claims, and it is intended that meanings equivalent to the claims and all modifications within the scope are included.

REFERENCE SIGNS LIST

1 Rotary electric machine
2 Rotor
3 Shaft
3a, 3b Tapered region
4 Stator
5 Housing body
6 Housing cover
7 Coil end portion
8 Bearing
12, 12a, 12b Rotor cover
13 Oil supply passage
15 First flow passage
16 Second flow passage
17 Groove portion
18 Communication hole
21 Cover body
22 Oil receiving portion
23 Oil guide portion
24 Oil injection port

The invention claimed is:
1. A rotary electric machine comprising:
a rotor;
a shaft that penetrates the rotor along a rotation axis and is pivotally supported by a bearing, the shaft comprising a delivery portion including an inclined surface protruding in a radial direction;
a stator having a cylindrical shape, the rotor being accommodated inside the stator, and the stator having a coil wound around an inner peripheral side;
a rotor cover attached to an axial end surface of the rotor; and
a casing having a flow passage for supplying oil to the bearing,
wherein the rotor cover has an oil receiving portion that protrudes axially in an axial direction with respect to the rotor cover and covers an exterior of the inclined surface of the shaft and is disposed opposite the inclined surface, wherein a concentric clearance is formed between the oil receiving portion and the inclined surface, the concentric clearance configured to store oil received from the bearing, wherein the oil receiving portion has an injection port for injecting the oil guided to the concentric clearance toward an inner periphery of the coil by centrifugal force, and wherein a distal end of the oil receiving portion protruding in the axial direction is adjacent to the bearing in the axial direction such that the distal end of the oil receiving portion opposes the bearing.

2. The rotary electric machine according to claim 1, wherein the rotor cover includes an oil guide portion on an outer peripheral side of the oil receiving portion, and the oil guide portion includes an inclined surface that reflects the oil injected from the injection port, and adjusts a position where the coil is cooled by the oil.

3. The rotary electric machine according to claim 1, wherein the rotor cover is made of metal and covers the axial end surface of the rotor, and the axial end surface of the rotor is cooled by the oil via the rotor cover.

4. The rotary electric machine according to claim 1, wherein the casing further includes: an oil spreading portion that spreads the oil from an upper side of the coil; and an oil supply passage for supplying the oil to the oil spreading portion, and the flow passage supplies the oil branched from the oil supply passage.

* * * * *